United States Patent
Bae et al.

(10) Patent No.: US 6,305,225 B1
(45) Date of Patent: Oct. 23, 2001

(54) ULTRASONIC SIGNAL FOCUSING METHOD FOR ULTRASONIC IMAGING SYSTEM

(75) Inventors: Moo-Ho Bae, Seoul; Mok-Kun Jeong, Kyunggi-do, both of (KR)

(73) Assignee: Medison Co., Ltd., Hongchun-kun (KR)

( * ) Notice: Subject to any disclaimer, the term of this patent is extended or adjusted under 35 U.S.C. 154(b) by 0 days.

(21) Appl. No.: 09/393,118

(22) Filed: Sep. 10, 1999

(30) Foreign Application Priority Data

Dec. 9, 1998 (KR) .................................................. 98-53976

(51) Int. Cl.[7] .............................. G01N 29/00; A61B 8/00
(52) U.S. Cl. ................................ 73/602; 73/597; 73/626; 600/447
(58) Field of Search .............................. 73/602, 597, 628, 73/626, 625, 598, 599, 600; 600/447, 458, 443, 442, 448

(56) References Cited

U.S. PATENT DOCUMENTS

| | | | |
|---|---|---|---|
| 4,835,689 | * | 5/1989 | O'Donnell .............................. 73/626 |
| 4,989,143 | * | 1/1991 | O'Donnell et al. ................... 600/437 |
| 5,278,757 | * | 1/1994 | Hoctor et al. ........................ 600/459 |
| 5,379,642 | * | 1/1995 | Reckwerdt et al. ..................... 73/625 |
| 5,522,391 | * | 6/1996 | Beaudin et al. ...................... 600/443 |
| 5,570,691 | * | 11/1996 | Wright et al. .......................... 73/626 |
| 5,763,785 | * | 6/1998 | Chiang .................................... 73/609 |
| 6,023,977 | * | 2/2000 | Langdon et al. ....................... 73/629 |
| 6,223,599 | * | 5/2001 | Langdon et al. ....................... 73/627 |
| 6,231,511 | * | 5/2001 | Bae ....................................... 600/447 |

* cited by examiner

Primary Examiner—Helen Kwok
Assistant Examiner—Jacques Saint-Surin
(74) Attorney, Agent, or Firm—F. Chau & Associates, LLP

(57) ABSTRACT

A focusing method plays a big role of determining a resolution of an ultrasonic image. Focusing is performed by controlling an arrival difference of a signal up to a focal point by an electronics delay circuit. Here, the focusing method for focusing an ultrasonic signal having emitted to a focal point of an object via an array transducer including a plurality of elements, obtains an optimal focusing time delay curve according to the ultrasonic signal travelling velocity to thereby obtain an optimal ultrasonic image. Using only data obtained without any modification of the structure of an existing ultrasonic imaging system, a focusing time delay curve is estimated. Thus, a resolution can be enhanced with only a simple calculation.

5 Claims, 2 Drawing Sheets

ULTRASONIC SIGNAL FOCUSING METHOD FOR ULTRASONIC IMAGING SYSTEM

BACKGROUND OF THE INVENTION

1. Field of the Invention

The present invention relates to an ultrasonic signal focusing method for focusing a received ultrasonic signal reflected from an object, and more particularly, to an ultrasonic signal focusing method for controlling a focusing delay time of a received ultrasonic signal to obtain a maximum resolution for use in an ultrasonic imaging system.

2. Description of the Related Art

In general, an ultrasonic imaging system emits an ultrasonic signal to an object to be examined, receives the ultrasonic signal reflected and returning from the discontinuous plane in the object, and then converts the received ultrasonic signal into an electrical signal to output it to a predetermined imaging apparatus, to thereby show the internal sectional structure of the object. The ultrasonic imaging system is widely used in a medical diagnostic field, a non-destructive testing field, an underwater detection field, etc.

In the ultrasonic imaging system, one of crucial factors required for functional improvement is an ultrasonic image resolution. It is steadily under development to improve the resolution. To improve the resolution, it is general that a recent ultrasonic imaging system uses an array transducer and performs transmission and receipt focusing through an electrical signal processing. A focusing method for an ultrasonic signal will be described below with reference to the accompanying drawings.

FIG. 1 shows transmission and receipt of an ultrasonic signal using an array transducer. The array transducer including a plurality of transducer elements converts an electrical signal into an ultrasonic signal and emits it to a focal point on an object. Then, the ultrasonic signal is reflected from a plurality of discontinuous planes on the object, and the reflected signal is input to the array transducer. When a plurality of discontinuous boundary planes exist in an object, an ultrasonic signal in each boundary plane is reflected in sequence and then input to the array transducer. The ultrasonic signal input to the array transducer after being reflected from the object has a different arrival of time according to the location of each transducer element. As shown in FIG. 1, a transducer element #0 located in the center of the array transducer receives an ultrasonic signal travelling as far as a distance of $S_0$ and being reflected from a focal point. However, since the n-th transducer element #n receives an ultrasonic signal travelling as far as a distance of $S_n$ ($S_n=S_0+\Delta S_n$) and returning therefrom, an arrival of time at the n-th transducer element #n is delayed as much as time corresponding to a distance of $\Delta S_n$ compared to the central transducer element #0. That is, as a transducer element is farther from the central transducer element #0, a time taken until when an ultrasonic signal arrives at the transducer element is prolonged. As described above, the ultrasonic signals input at a respectively different time are converted into an electrical signal in each transducer element. Thus, the above time difference should be delayed and compensated for in order to perform a focusing of the electrical signal output from each transducer element.

FIG. 2 shows a receipt focusing at the time of receiving an ultrasonic signal. The ultrasonic signals input to the transducer elements in the array transducer are applied to delays in sequence of time when the ultrasonic signals arrive at the transducer elements. Each delay delays an ultrasonic signal by a time difference corresponding to a distance where the firstly applied ultrasonic signal has proceeded, and outputs the delayed result. Thus, as shown in FIG. 2, the phases of the ultrasonic signals having passed through the delays are aligned in a line. An adder adds all the ultrasonic signals whose phases have been aligned in a line. Then, it becomes as if the ultrasonic signals having started at the focal point arrive at all the transducer elements at the same time. Since these signals are same in phase, the amplitude of the ultrasonic signal becomes maximized at the point where the ultrasonic signals are added. However, at the points other than the point where the ultrasonic signals are added, since the signals do not arrive at the same time, their phases are different from each other and offset resulting in a weak signal.

The above delay will be described in more detail using the following equation (1). Assuming that a distance between the central transducer element #0 and the transducer element #n in the array transducer is $X_n$ at the time of focusing the ultrasonic signal, an arrival delay distance $\Delta S_n$ is calculated as the following equation (1).

$$\Delta S_n = S_n - S_0 = \sqrt{S_0^2 + x_n^2} - S_0 \tag{1}$$

Here, $S_n$ represents a distance from the focal point to the transducer element #n, and $S_0$ represents a distance from the focal point to the transducer element #0.

Also, an arrival delay time $\Delta td_n$ of the n-th transducer element #n with respect to the central transducer element #0 is calculated as the following equation (2).

$$\Delta td_n = \Delta S_n / C_0 \tag{2}$$

Here, $C_0$ represents an ultrasonic signal travelling velocity in the medium including an object. Thus, if the number of the transducer elements is (2N+1), a focusing delay time of the n-th transducer element #n is calculated as the following equation (3).

$$\Delta fd_n = \Delta td_N - \Delta td_n \tag{3}$$

When the focusing delay time $\Delta fd_n$ is applied to the n-th transducer element #n, the phases of the signal can be aligned in a line as shown in FIG. 2. Here, a curve formed by connecting the focusing delay times with respect to the signals received at all the transducer elements is called a focusing time delay curve.

An ultrasonic signal travelling velocity (the velocity of sound) used for calculation of the focusing delay time in the current ultrasonic imaging system as described above uses a value of 1540 m/s which is an average velocity at a soft tissue of a human body. The human body is formed of a composite medium having various velocities from 1400 m/s to 1600 m/s, among which fat having a velocity of 1400 m/s becomes the greatest error factor. In particular, in the case that subcutaneous fat is thick at the time of abdominal diagnosis, the actual time taken until when the signal is returned is lagged in time compared to the arrival time calculated under the assumption of a uniform velocity. The above error effect causes reduction of an image brightness, lowering of a resolution, deformation of a shape, a ghost phenomenon, etc., due to a decrease of a main lobe and an increase of a side lobe in an ultrasonic signal because the phase of the received signal is not aligned thereby lowering a focusing characteristic. In addition, a big error is brought about in the case of application such as the calculation of a capacity of the heart or kidney requiring geometrical size or distance information of the medium. In order to compensate for the above error, an error of a focusing delay time generated due to a difference between the ultrasonic signal travelling velocities at the media or a relative velocity difference depending upon paths is obtained and then offset. However, it has been difficult that an ultrasonic signal travelling velocities at the media and a relative velocity depending upon the travelling path are obtained in each transducer element.

SUMMARY OF THE INVENTION

To solve the above problems, it is an object of the present invention to provide an ultrasonic signal focusing method for an ultrasonic imaging system in which an ultrasonic signal travelling velocity (the velocity of sound) at a medium is varied to obtain an optimal focusing delay time, and then a focusing is performed using a focusing time delay curve obtained by connecting the focusing delay time, thereby heightening a resolution at maximum and obtaining the most accurate geometrical size or distance information of an object to be examined.

To accomplish the above object of the present invention, there is provided a focusing delay method in an ultrasonic signal focusing method for focusing an ultrasonic signal via an array transducer including a plurality of transducer elements, the ultrasonic signal focusing method comprising the steps of: (a) estimating a travelling distance of an ultrasonic signal returning from a focal point and points adjacent to the focal point; (b) estimating an ultrasonic signal travelling velocity at the media including an object so that a receipt time at a transducer element located at the center of the array transducer corresponds to the estimated travelling distance; (c) obtaining a travelling distance of the ultrasonic signal to the focal point using the fixed receipt time and the estimated ultrasonic signal travelling velocity and calculating a focusing delay time according to the travelling distance, thereby obtaining a focusing time delay curve; (d) varying the ultrasonic signal travelling velocity estimated in step (b), repeating the step (c), and thus obtaining a brightness or contrast of an ultrasonic image; and (e) determining a corresponding travelling velocity obtained when the brightness or contrast of the ultrasonic image in the step (d) becomes maximum as an average ultrasonic signal travelling velocity at the medium and then determining the focusing time delay curve as an optimal focusing time delay curve, thereby obtaining an ultrasonic image.

BRIEF DESCRIPTION OF THE DRAWINGS

The above object and other advantages of the present invention will become more apparent by describing the preferred embodiments thereof in more detail with reference to the accompanying drawings in which.

DETAILED DESCRIPTION OF THE PREFERRED EMBODIMENT

A preferred embodiment of the present invention will be described with reference to the accompanying drawings.

Figure 1:
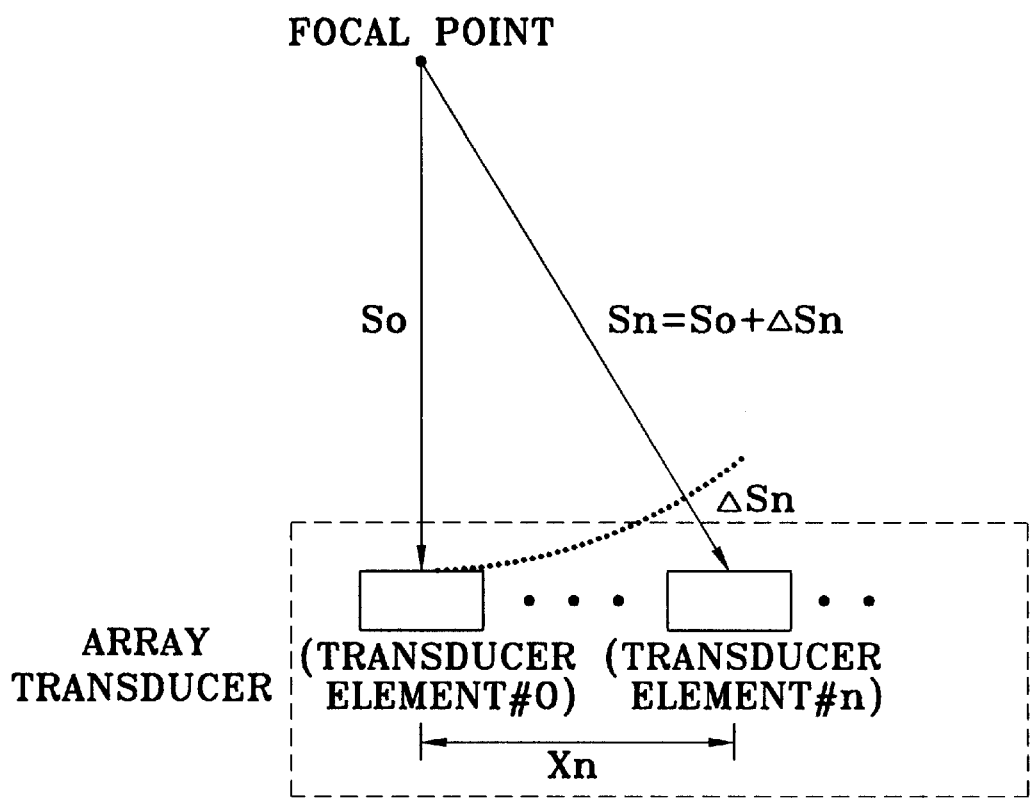
FIG. 1 shows transmission and receipt of an ultrasonic signal using an array transducer.
Figure 2:
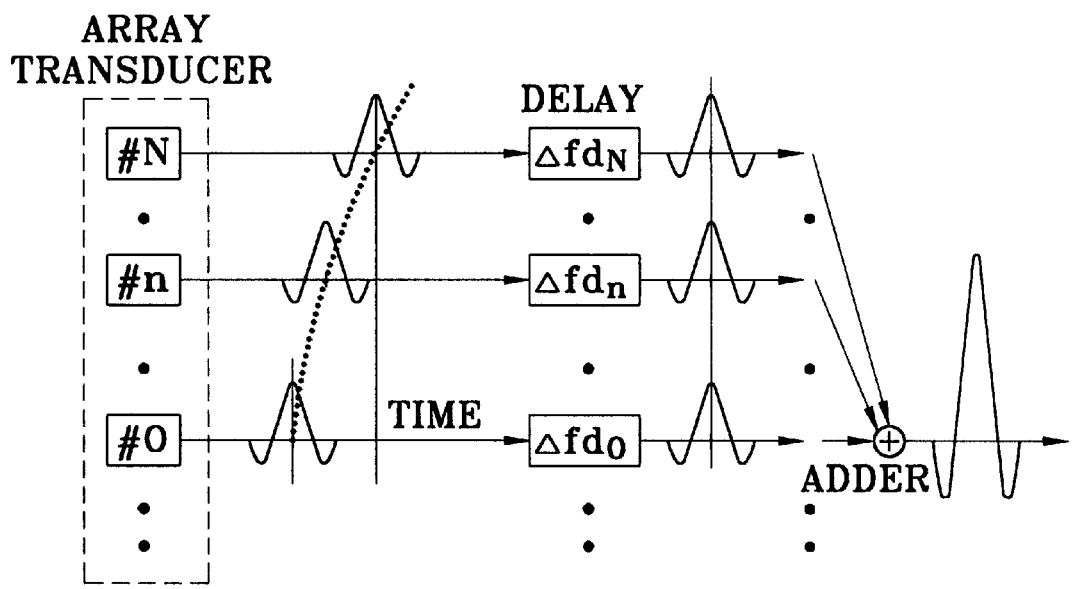
FIG. 2 shows a receipt focusing at the time of receiving an ultrasonic signal.
Figure 3:
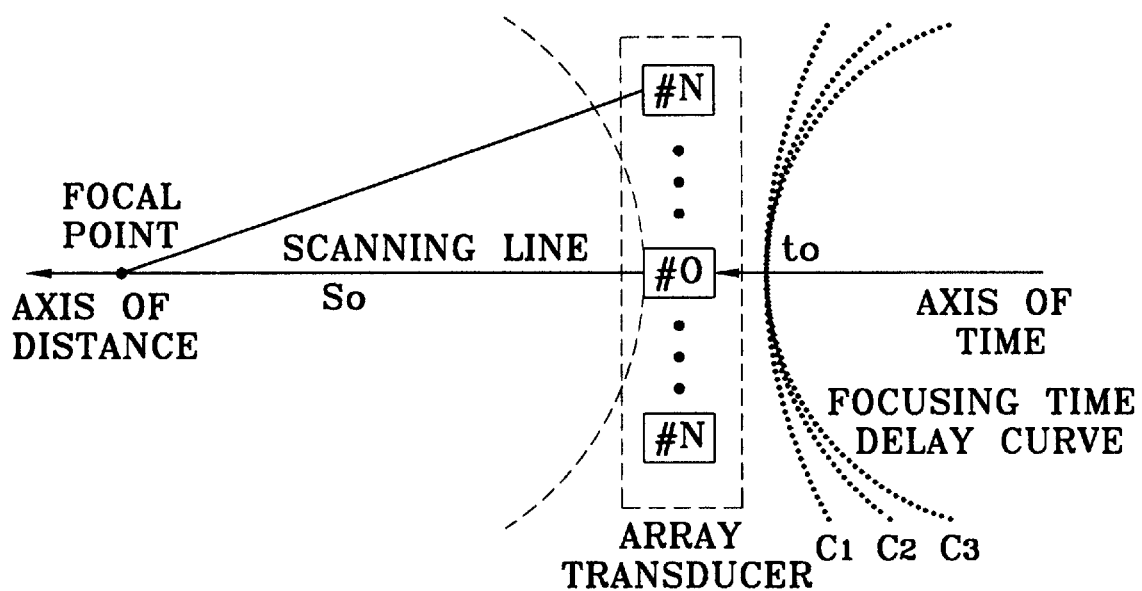
FIG. 3 is a view for explaining change in focusing delay time due to the difference between the ultrasonic signal travelling velocity.

FIG. 3 is a view for explaining change in focusing delay time due to the difference between the ultrasonic signal travelling velocity. Dotted curves represent focusing time delay curves when an ultrasonic signal travelling velocity at the medium is $C_1$, $C_2$, and $C_3$ ($C_1 > C_2 > C_3$), respectively. Also, when an ultrasonic signal is input to the focal point, an ultrasonic signal travels at a constant velocity at the medium. The distance (depth) calculated from the travelling time is called a travelling distance (or a focusing depth) of the ultrasonic signal. That is, a distance from a focal point to a transducer element is called a focusing depth.

In FIG. 3, when an ultrasonic signal travelling velocity at the medium is $C_1$, $C_2$, and $C_3$ ($C_1 > C_2 > C_3$), respectively, as the ultrasonic signal travelling velocity is slower, the time difference at the time of arrival of the ultrasonic signal becomes much larger in the case of the outer transducer element than that of the central transducer element. Accordingly, a curvature of the focusing time delay curve becomes larger. Here, if the curvature of the focusing time delay curve is accurate, the phase of the signal received at all the transducer elements is aligned without any error. Accordingly, a rightness or contrast of an image becomes maximized at the focusing depth. However, if the curvature of the focusing time delay curve is not accurate, a phase error occurs to thereby decrease a brightness or contrast. Thus, if a brightness or contrast of an image is checked while varying an ultrasonic signal travelling velocity and an ultrasonic signal travelling velocity is found when the brightness or contrast of the image is maximized, an optimal focusing time delay curve having an accurate curvature can be obtained.

At first, a travelling distance (focusing depth) of the ultrasonic signal received in the vicinity of the target focal point is estimated. A receipt time $t_0$ at the element located at the center of the array transducer in correspondence to the travelling distance is fixed. Then, an ultrasonic signal travelling velocity $C_0$ of the media including an object is estimated. Using the fixed receipt time $t_0$ and the estimated ultrasonic signal travelling velocity $C_0$, a travelling distance (focusing depth) $S_0$ of the ultrasonic signal up to the focal point is obtained ($S_0 = t_0 \times c_0$). Then, the obtained travelling distance $S_0$ is applied to the above equations (2) and (3) to calculate a focusing delay time, and then obtain a focusing time delay curve. An ultrasonic image is obtained according to the focusing time delay curve. Then, under the same condition, that is, under the fixed receipt time $t_0$, the ultrasonic signal travelling velocity is varied, and an ultrasonic image is obtained in the same manner as the above. Also, a plurality of focusing time delay curves are obtained in the adjacent points including the focal point in the above-described method, and an ultrasonic image is formed according to the focusing time delay curves, to then compare a respective brightness or contrast. In the result of comparison, an ultrasonic signal travelling velocity obtained when the brightness or contrast of the ultrasonic image is maximized is determined as an average ultrasonic signal travelling velocity at the medium, in which case a focusing time delay curve is determined as an optimal focusing time delay curve. Thus, an ultrasonic image having an optimal resolution can be obtained and geometrical size or distance information of the target object to be examined can be the most accurately obtained as well.

So far, the focusing time delay curves have been obtained under the assumption that the ultrasonic signal travelling velocities are same in the whole medium. The case that the ultrasonic signal travelling velocities are not same in the whole medium will be described with reference to FIG. 4.

Figure 4:
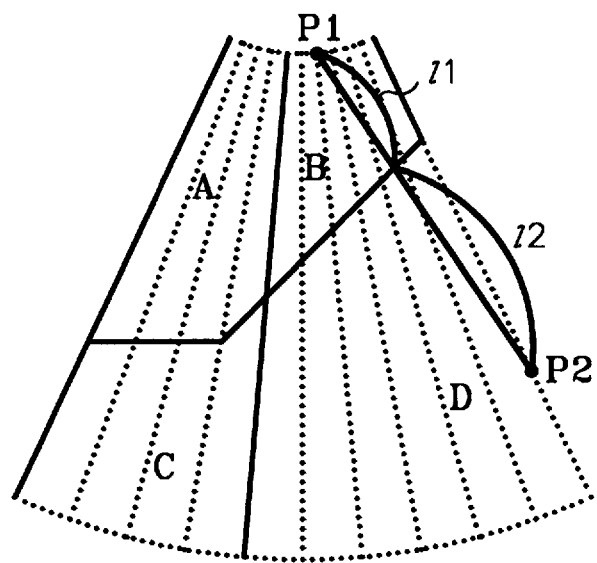
FIG. 4 is a view showing that the velocity of a corresponding region is obtained at a medium sectioned into a variety of regions.

FIG. 4 is a view showing an example of sectioning regions. In this embodiment according to the present invention, the whole medium is sectioned into various regions according to the distance from an array transducer. However, it is not limited to only the distance, but there are various methods for sectioning regions.

The scanning lines of lateral direction shown in FIG. 4 are independent of each other. Thus, an ultrasonic signal travelling velocity can be independently calculated with respect to each scanning line, to thereby ideally obtain a time delay curve. Alternatively, in order to reduce an amount of calculation, a variety of scanning lines are grouped and determined as a single region, to then calculate an ultrasonic signal travelling velocity. In this embodiment, it is assumed that a scanning line is independent. In the axial direction, portions where an ultrasonic signal travelling velocity is changed such as a boundary plane between the subcutaneous fat and the muscle, a boundary plane between the muscle and the liver, etc., are determined as boundary planes.

First, an ultrasonic signal travelling velocity at a portion close to a probe is obtained in the above-described manner. The following region is varied in turn to find an optimal velocity of sound in the same manner, under the assumption of the velocity of sound corresponding to the region. In the case that a region is not the first region but is different from the immediately previous region in view of the velocity of sound, a focusing delay time should be, strictly speaking, calculated considering refraction of the ultrasonic signal generated from the boundary plane. A path according to refraction transmitting the media of two layers having a respectively different velocity is expressed in a biquadratic as the following equation (4).

$$z^4 + az^3 + bz^2 + cz + d = 0 \qquad (4)$$

Since solutions of the biquadratic shown in the above equation (4) are disclosed in the reference "Study on Velocity In-homogeneous Effect in fat and its Correction in Ultrasound Imaging System" of J. H. Kim, M. H. Bae and M. K. Jeong issued in February, 1998, the detailed description thereof will be omitted.

In FIG. 4, assuming that an ultrasonic velocity at the region B is v1 and that at the region D is v2, a focusing delay time t from P1 to P2 is expressed as shown in the following equation (5).

$$t = t_1 + t_2 = \frac{l_1}{v_1} + \frac{l_2}{v_2} \qquad (5)$$

Here, $t_1$ and $t_2$ are delay times at the regions B and D, respectively. Also, $l_1$ and $l_2$ are travelling distances of the ultrasonic signal at the regions B and D, respectively. In order to reduce an amount of calculation, all scanning lines of one region need not be calculated, but a representative scanning line or several scanning lines are calculated to then determine the calculated result as the velocity of the region. The above-described ultrasonic focusing method can be applied both the two-dimensional ultrasonic imaging system and the three-dimensional imaging system.

As described above, the present invention provides a focusing method in which the velocity of sound of the received signals at the medium is varied in the array transducer, to thereby obtain a respective focusing delay time to maximize a resolution and obtain geometrical size or distance information of the object to be examined the most accurately. According to the present invention, a focusing delay time is estimated using only the data obtained without any modification of the structure of an existing ultrasonic imaging system. Thus, the present invention can obtain the most accurate geometrical size or distance information of an object to be examined as well as a resolution by means of only a simple calculation.

What is claimed is:

1. A focusing delay method in an ultrasonic signal focusing medium for focusing an ultrasonic signal returning from a focal point on an object in a medium via an array transducer including a plurality of transducer elements, the ultrasonic signal focusing method comprising the steps of:

(a) estimating a travelling distance of an ultrasonic signal returning from the focal point and points adjacent to the focal point;

(b) estimating an ultrasonic signal travelling velocity at the medium including an object so that a receipt time at a transducer element located at the center of the array transducer is fixed as a reference time and corresponds to the estimated travelling distance;

(c) obtaining a travelling distance of the ultrasonic signal to the focal point using the estimated ultrasonic signal travelling velocity and calculating a focusing delay time according to the travelling distance, thereby obtaining a focusing time delay curve;

(d) varying the estimated ultrasonic signal travelling velocity and using the reference time and each of the varied ultrasonic signal travelling velocity to obtain a travelling distance of the ultrasonic signal to the focal point corresponding to each of the ultrasonic signal travelling velocity;

(e) calculating a focusing delay time according to the travelling distance of each of the ultrasonic signal and obtaining a respective focusing time delay curve, and from the focusing time delay curve, forming a calculated ultrasonic image and obtaining brightness or contrast of the calculated ultrasonic image;

(f) determining a corresponding travelling velocity obtained when the brightness or contrast of the ultrasonic image in step (e) becomes maximum as an average ultrasonic signal travelling velocity at the medium and then determining the corresponding focusing time delay curve as the optimal focusing time delay curve and the optimal ultrasonic image.

2. The focusing delay method according to claim 1, wherein in said step (a), the medium including the object is divided into a plurality of regions according to a predetermined standard.

3. The focusing delay method according to claim 2, further comprising the steps of:

estimating a travelling distance of the ultrasonic signal returning from the focal point and points adjacent to the focal point according to the divided region; and repeating steps (a) to (f) for every divided region, to thereby obtain an ultrasonic image from the optimal focusing time delay curve determined in each region.

4. The focusing delay method according to claim 2, wherein said region sectioning is performed in a boundary plane of a respectively different object where it is expected that the ultrasonic signal travelling velocity would be varied.

5. The focusing delay method according to claim 3, wherein said step (1) is performed from the region which is the closest from the array transducer.

* * * * *